No. 613,918. Patented Nov. 8, 1898.
R. N. CHAMBERLAIN & A. S. HUBBARD.
ELECTRIC LIGHTING SYSTEM FOR VEHICLES.
(Application filed Feb. 17, 1898.)

(No Model.) 3 Sheets—Sheet 1.

No. 613,918. Patented Nov. 8, 1898.
R. N. CHAMBERLAIN & A. S. HUBBARD.
ELECTRIC LIGHTING SYSTEM FOR VEHICLES.
(Application filed Feb. 17, 1898.)

(No Model.) 3 Sheets—Sheet 2.

No. 613,918. Patented Nov. 8, 1898.
R. N. CHAMBERLAIN & A. S. HUBBARD.
ELECTRIC LIGHTING SYSTEM FOR VEHICLES.
(Application filed Feb. 17, 1898.)
(No Model.) 3 Sheets—Sheet 3.
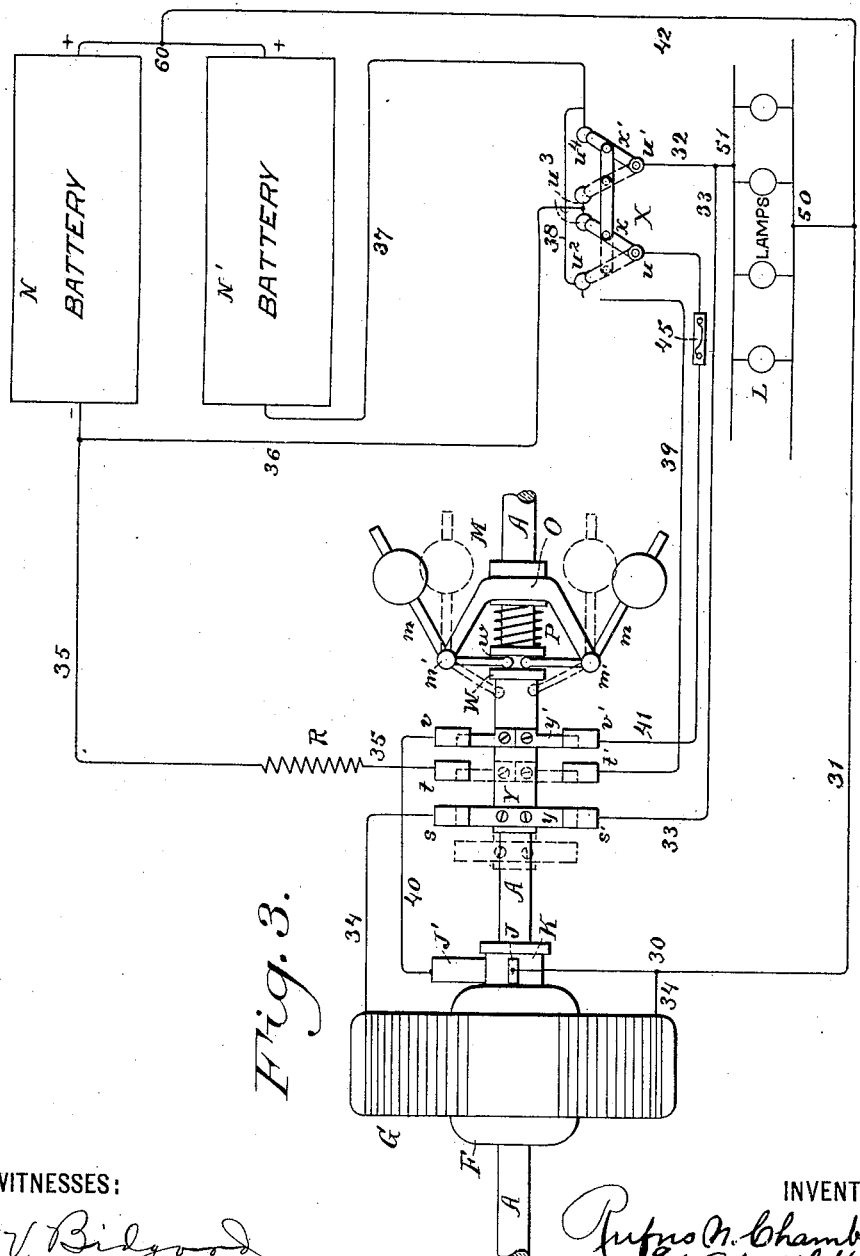

UNITED STATES PATENT OFFICE.

RUFUS N. CHAMBERLAIN AND ALBERT S. HUBBARD, OF BELLEVILLE, NEW JERSEY.

ELECTRIC-LIGHTING SYSTEM FOR VEHICLES.

SPECIFICATION forming part of Letters Patent No. 613,918, dated November 8, 1898.

Application filed February 17, 1898. Serial No. 670,670. (No model.)

*To all whom it may concern:*

Be it known that we, RUFUS N. CHAMBERLAIN and ALBERT S. HUBBARD, citizens of the United States, residing at Belleville, Essex county, State of New Jersey, have invented certain new and useful Improvements in Electric-Lighting Systems for Vehicles, of which the following is a specification.

This invention relates to improvements in electric-lighting systems for vehicles, particularly for railway-cars.

It has been proposed to light the cars of steam-railways by electricity generated by the rotation of the car-axle and stored in storage batteries, and various attempts have been made in this direction. In such cases the armature of the dynamo has either been driven by gearing or belting from the car-axle or has been directly mounted thereon. Gear or belt driving is objectionable as being noisy and apt to break or get out of order. Direct mounting of the armature on the axle has, on the other hand, hitherto involved the disadvantage of winding the armature while it is *in situ* on the axle, which is an expensive and laborious operation, involving the laying up of the car-truck for some time. We overcome these difficulties by a sectional construction of the generator, allowing of its rapid and economical attachment to the car-axle without the necessity of subsequent laborious winding of same.

In the systems heretofore proposed, owing to the methods of control and regulation adopted, the fluctuations of candle-power in the lights have been very pronounced. In our system these fluctuations are so far overcome as to be practically eliminated by a special construction or winding of the generator and by the arrangements for governing the charging and discharging of the batteries more fully described hereinafter.

Figure 1:
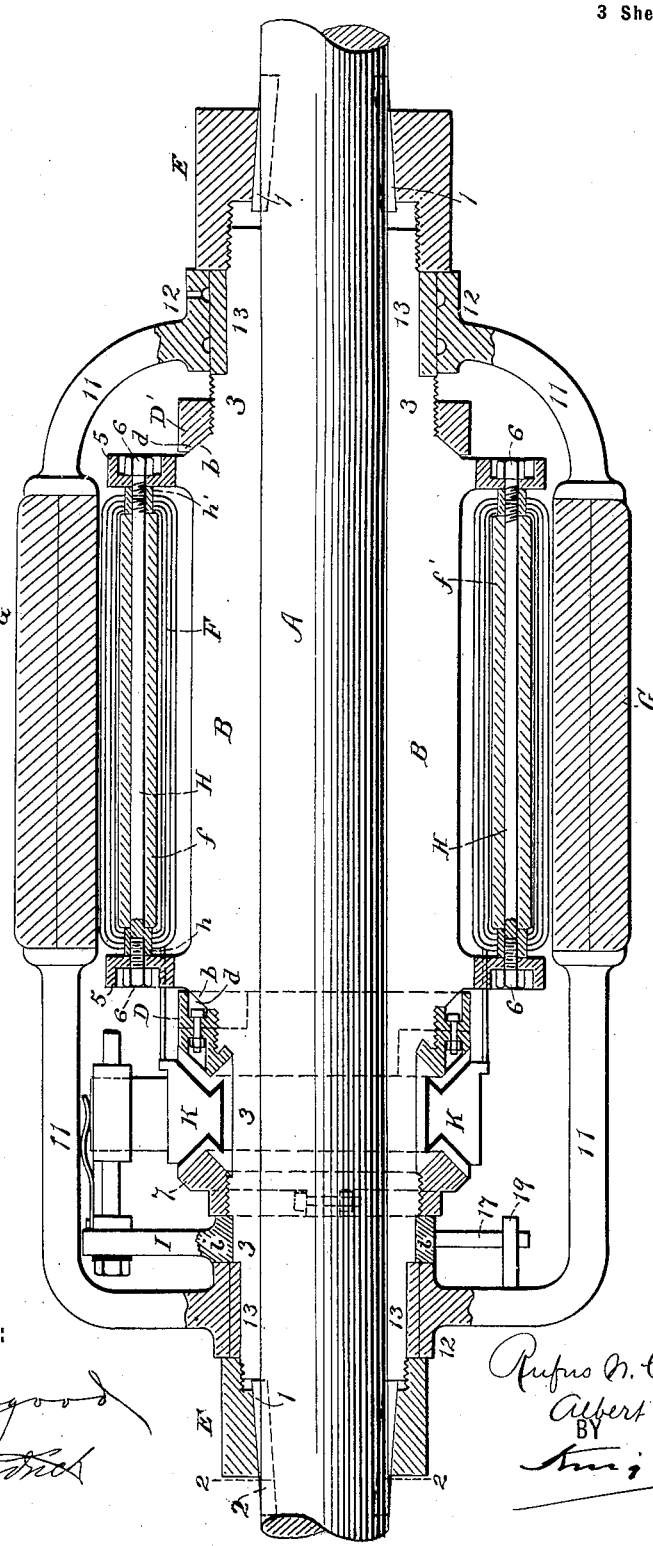
Figure 2:
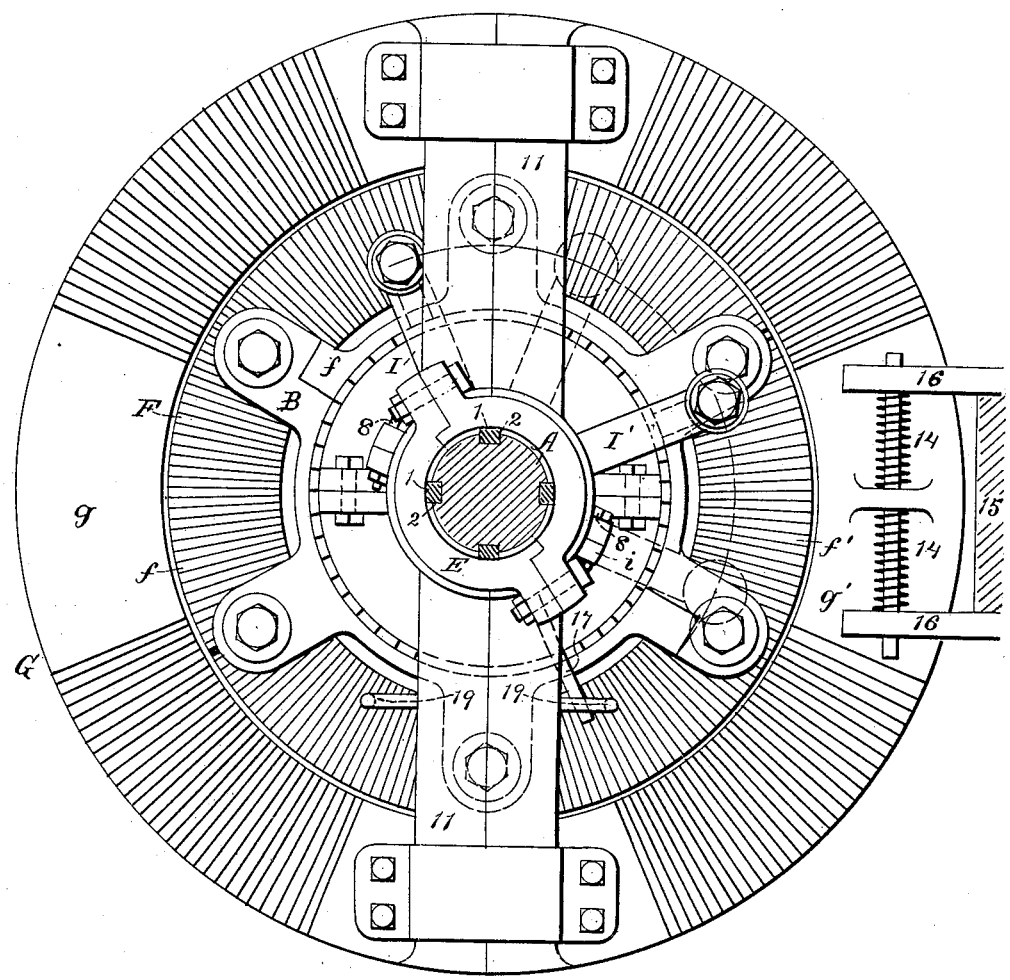

In the accompanying drawings, which form a part of this specification, Figure 1 is an axial section of the generator. Fig. 2 is a transverse section of same on the line 2 2 in Fig. 1. Fig. 3 is a diagram showing the system of connections.

A represents the car-axle, to which is fastened the armature-spider B of the generator. This armature-spider is made in sections, and its two parts after being assembled around the axle are held together by rings or collars D D', engaging by inner screw-threads with screw-thread portions of the split spider and also engaging by cone portions $d$ with cone portions $b$ of said spider. The two parts of each split ring D or D' are bolted together after being placed over the axle and around the spider, and the two complete rings thus formed are screwed toward one another, thus firmly clamping the spider-sections rigidly together. The spider thus assembled is fastened to the car-axle by means of a grip or clutch at each end, consisting of any suitable number of keys 1, placed in inclined notches 2, formed in the car-axle in any suitable manner, and a split sleeve E, having a conical bore engaging with said keys and an inner screw-thread engaging with a screw-thread in the end of the tubular prolongation 3 of the armature-spider. Thus as these two sleeves E, after having been assembled over the axle and the two halves of each bolted together, are screwed over the ends of the spider they are caused to grip or clutch the keys 1, and thus bind the spider B tightly to the car-axle.

All of the other parts of the generator are formed in two or any desired number of sections and are suitably attached to or supported on this spider B. Thus the armature F may consist of two sections $f f'$, which are attached to the spider B in the manner indicated in Fig. 1, a number of bolts H being placed through the armature-core, and each having a hollow tapped head $h$ at one end and having at the other end a nut $h'$, screwed thereon, so that each section of the armature may be slipped laterally between the flanges 5 of the spider B and may then be fastened by short bolts 6, passing through such flanges and into the tapped head $h$ or the nut $h'$, as the case may be. The commutator K is also formed in halves, the two sections of the shell or commutator-spider being simply assembled around the spider-sleeve 3 and then held in place by split ring 7, the commutator-sections being clamped between the split rings 7 and D.

I I' are the brush-holder arms, attached to a split ring $i$, whose sections are bolted together by bolts 8.

The halves $g g'$ of the field-magnet frame G are bolted together at 9 and are carried by arms 11, fastened thereto and extending to the journal-bearings 12, which embrace the bearing portions 13 13 of the tubular extensions 3 of the armature-spider B.

From the above description it is apparent that the generator as a whole can be put on and around the axle without the necessity of winding either armature or field after such assemblage. The coils of the armature, whether the latter be of the Gramme-ring or drum form, are applied to the two sections of same before they are assembled on the axle. In case a drum-winding be used it will be necessary to use coils of the non-interlocking type, such as the Eickemeyer or Hochhausen type.

To hold the field-magnet frame G from rotating, it may engage with a portion of the car-truck frame 15, as shown in Fig. 2, springs 14 14 being interposed between the field-magnet frame and suitable stops 16 16 on the truck-frame to give an elastic support.

Inasmuch as this generator is intended to be used in connection with storage batteries, it is essential that the electromotive force thereof should be kept within fairly constant limits and that it should always be exerted in one direction independently of the direction of rotation of the car-axle. To secure constant direction of current, any suitable reversing means for either the field-magnet or armature of the generator may be provided; but we prefer to effect the same result by shifting the commutator-brushes to correspond with the shifting of polarity on the commutator due to reversal of armature rotation. For this purpose the brush-holder-supporting ring $i$ is mounted loosely on the spider-sleeve 3, so as to be capable of rotary movement thereon around the axis of the commutator, and stops 19, carried by the field-magnet frame, are provided, which engage with an arm 17 on the brush-holder ring $i$ to limit the rotary movement of the brush-holders. As the generator-armature turns in one direction or the other the friction of the commutator against the brushes carries the brush-holders over in the direction of rotation until arm $i$ comes against the corresponding stop, which is so located as to bring the brushes at that time in contact with those parts of the commutators presenting the proper electromotive force. On reversal of motion of the armature the brush-holders are shifted by friction in the opposite direction until the arm $i$ strikes the other stop and the brushes are thereby brought into contact with other parts of the commutator to correspond with the shifting of polarity in the commutator due to reversal of armature rotation. To secure constancy of electromotive force, we prefer to wind the armature and field-magnet of the generator in such manner that the armature will be comparatively strong and the field relatively weak, so that the effects of armature reaction will be excessive. For this purpose the amount of iron in the armature-core and the number of turns of winding on same should be made much larger than usual in proportion to the amount of iron in the field-magnet frame and the ampere-turns exciting same. The field-magnet being excited by a circuit independent of the load-current, it will be understood that as soon as the latter current tends to become excessive the armature action will be correspondingly increased and, owing to the excessive armature reaction, will cut down the electromotive force proportionately, so that the resultant increase of current will be but slight. Moreover, the parts are adjusted to give the normal electromotive force and current when the armature is running at or somewhat below the normal speed, so that any excess of speed will not proportionately raise the electromotive force and current, the armature reaction tending to hold both the electromotive force and current down to near the normal limits.

We will now describe the system of car-lighting of which the above-described generator forms a part, special reference being had to Fig. 3, wherein F represents the armature, G the field-magnet, and K the commutator of the generator. N N' are two groups or sets of storage batteries of suitable capacity, L are the lamps to be energized, and M is a governor for controlling the connections of the dynamo, batteries, and lamps according to the state of rest or movement of the car. This governor may consist of two weighted arms or levers $m$, pivoted at $m'$ to a bracket or hanger O, which is fastened on the car-axle A so as to revolve with it. A switch-plate Y is mounted to slide on the axle A, but does not turn therewith. The governor-levers $m$ engage with an annular groove $w$ in a collar W, attached to the switch-plate Y, so that as the governor-levers move out they force the switch-plate Y along the shaft, this movement being resisted by a spring P, which is placed between the collar W and the hub of the hanger O. The switch-plate Y carries two insulated contact-pieces $y$ $y'$, the contact $y$ being capable of making contact with or bridging a pair of fixed contacts $s$ $s'$ and the contact $y'$ engaging with one or the other of two pairs of contacts $t$ $t'$ $v$ $v'$, according to the position of the governor.

X represents a two-way switch for directing the current from either of the batteries N N' to the lamps, at the same time putting the other battery in connection with the generator for charging, the same switch also serving to open both the charging and the consumption circuits. Said switch comprises two pivoted contact-arms $x$ $x'$, mechanically connected but electrically insulated from one another, pivoted to terminals $u$ $u'$ and engaging with fixed contacts $u^2$ $u^3$ $u^4$.

The electrical connections are as follows: Brush J of the generator is connected to a junction-point 30, from which a wire 31 leads to one side, 50, of the lamp-circuit, from the other side, 51, of which a connection 32 leads to the terminal $u'$ of switch X and another connection, 33, to contact $s'$ of the governor-switch. The field-magnet-exciting circuit 34 also leads from the junction-point 30 through the field-magnet coils to contact $s$ of the governor-switch. Contact $t$ of said switch is connected, through a wire 35, including a resistance R, to one terminal of battery N, which is also connected by wire 36 to the contact $u^3$ of the two-way switch X. The corresponding terminal of the other battery, N', is connected by wires 37 38 39 to contacts $u^2$ $u^4$ of switch X and to contact $t'$ of the governor-switch. The opposite terminals of the batteries are connected together at 60 to a common return-wire 42, leading to the side 50 of the lamp-circuit, and thence through wire 31 to the brush J of the generator. Contacts $v$ $v'$ of the governor-switch are connected, respectively, by wire 40 with generator-brush J' and by wire 41 with terminal $u$ of switch X. The connection 41 may include a fuse-block 45.

When the car is at rest, the governor-weights lie close to the axle and the switch-plate is retracted into the position shown in dotted lines, in which position the contact-piece $y$ is out of contact with contacts $s$ $s'$, while contact-piece $y'$ connects contacts $t$ $t'$. This position of the governor-switch disconnects the generator from the lamp and battery circuits and places the two batteries in circuit with the lamps and in multiple with one another, the circuit leading as follows: from battery N' directly through wire 37 to contact $u^4$ and from battery N, through wire 35, resistance R, contact $t$, contact-piece $y'$, contact $t'$, wire 39, contact $u^2$, wire 38, to contact $u^4$, the two parallel circuits thus traced then being completed through wire 32, lamp-circuit 51 50, and common return 42 to the other side of both batteries. If the switch X be thrown to the other side, as shown in dotted lines, then the circuit of battery N will pass directly through wire 36 to contact $u^3$, switch-arm X', and thus to terminal $u'$, wire 32, and the lamps, while the circuit from battery N' in this case leads through wires 37, 38, and 39 to contact $t'$ of the governor-switch and thence, through contact-piece $y'$, wire 35, and resistance R, to the corresponding side of battery N, from which its circuit leads to the lamps as traced from battery N. In both cases, therefore, the batteries are put in multiple by the engagement of the contact-piece $y'$ with contacts $t$ $t'$, which closes a connection between the similar sides of the two batteries, this connection including in each case the resistance R.

When the car is started and the axle A begins to rotate, the governor-arms $m'$ begin to diverge and to operate the switch-plate Y, and when a certain speed is reached the contact-piece $y$ is brought in contact with contacts $s$ $s'$, the piece $y'$ being still in contact with contacts $t$ $t'$. Contact $v$ being still out of circuit, the armature is not yet in operative connection; but the closing of contacts $s$ $y$ $s'$ brings the field-magnet-exciting circuit 34 into connection with the storage batteries N N' in parallel with the lamp L, the circuit being traced from the batteries N N' to the side 51 of the lamp-circuit, as already described, and passing from said point 51 in multiple with the lamps through wire 33, contacts $s'$ $y$ $s$, and field-magnet-exciting circuit 34 to wire 31 and so back to the batteries through wire 42. The field-magnets are thereby at once brought up to full magnetization, or practically so, before the armature has begun to deliver current. When the speed of the armature has increased sufficiently to develop an electromotive force capable of overcoming that of the batteries, the governor moves the switch contact-piece $y'$ away from contacts $t$ $t'$ and to contacts $v$ $v'$, the piece $y$ being still in engagement with contacts $s$ $s'$. The separation of contacts $t$ $y'$ $t'$ breaks the multiple connection between the batteries N N', while the closing of contacts $v$ $y'$ $v'$ brings the armature of the generator into circuit.

Assuming the switch X to be in the full-line position, a circuit may now be traced from the armature through brush J', wire 40, contacts $v$ $y'$ $v'$, wire 41, terminal $u$, switch-arm $x$, contact $u^3$, and wire 36 to battery N, and through said battery and wires 42 and 31 back to the other brush J of the generator. Through the circuit thus traced the generator charges the battery N, while at the same time the battery N', which is now disconnected from the generator, is being discharged through the lamps, the circuit being from one side of said battery through wire 37, contact $u^4$, switch-arm $x'$, terminal $u'$, wire 32, lamp-circuit 51 50, and wire 42 back to the other side of battery N'. If the switch X be thrown to the other side, as shown in broken lines, the relations of the batteries N N' to the generator and the lamps, respectively, are reversed. The charging-circuit leads in this case from brush J' through wire 40, contacts $v$ $y'$ $v'$, and wire 41, as before, to terminal $u$, thence through switch-arm $x$, contact $u^2$, and wires 38 and 37 to the battery N', and through this battery and wires 42 and 31 back to the generator-armature. The consumption or discharging circuit leads from battery N through wire 36, contact $u^3$, switch-arm $x'$, terminal $u'$, and wire 32 to the lamps and through said lamps and the wire 42 back to the other side of battery N.

By shifting the switch to one side or the other the attendant may at any time recharge the battery that has been discharging and at the same time supply the lamp-circuit from the other battery, which has been recharging. Thus when the car is in motion one battery is always being recharged, while the other battery is supplying the lamps, and the generator is never directly connected with the lamp-circuit. This latter feature is of importance, as it insures a constant voltage in the lamps.

When the car slows down, the first effect of the governor is to break the armature connection and put the batteries in multiple by a connection which includes the resistance R, as above described. If the two batteries are of unequal voltage, due to difference in their charge, there will be an equalization through this connection, the high-voltage battery sending current back through the other one and raising its charge until the two batteries become of equal voltage. The object of resistance R is to prevent excessive current during this operation in case of a wide difference of voltage in the batteries. Finally, as the car continues to slow down the governor-switch opens the field-magnet-exciting circuit and the parts are restored to the position first described. The batteries being now left in multiple on the lamp-circuit, the discharge effect is borne by both batteries equally, thus giving larger capacity and uniformity of action on the two batteries.

Having thus described our invention, what we claim, and desire to secure by Letters Patent, is—

1. In a system of electric lighting for cars and other vehicles, the combination with a generator and a lamp-circuit, of two storage batteries and a switch connecting said generator and lamp-circuit interchangeably with the two storage batteries, and another switch and connections controlled thereby, for connecting the two batteries in multiple, while placing both of said batteries in connection with the lamp-circuit, but disconnecting them from the generator.

2. In a system of electric lighting for cars and other vehicles, the combination with a generator and a lamp-circuit, of two storage batteries and a switch connecting said generator and lamp-circuit interchangeably with the two storage batteries, and another switch and connections controlled thereby, for connecting the two batteries in multiple, while placing both of said batteries in connection with the lamp-circuit, but disconnecting them from the generator, the multiple connection between the batteries including a resistance.

3. In a system of electric lighting for vehicles, the combination with the vehicle and an axle thereof, of a generator driven by said axle, a governor also driven by said axle, a lamp-circuit, and two storage batteries, a two-way switch and connections interchangeably connecting said lamp-circuit and generator to the two batteries and a switch controlled by aforesaid governor and connections controlled by said switch which when the governor is at rest disconnect the generator from the lamp-circuit and battery, and when the governor has attained a certain speed, connect the generator with one or the other of the batteries according to the position of the two-way switch, the other battery being connected to the lamp-circuit.

4. In a car-lighting system, the combination with a car and an axle thereof, of a lamp-circuit and a storage battery, a generator having its armature driven by the axle, and having its field-magnet in a circuit separate from the armature-circuit, a governor also driven by the axle, a switch and connections controlled by said governor adapted to disconnect both the armature and the field-circuit of the generator from the storage battery and lamp-circuit when the governor is at rest, and when the governor is set in motion with increasing speed, to first put the field-magnet circuit of the generator in connection with the storage battery, and then connect the armature of the generator with the storage battery, and a switch and connection for controlling the connection of the storage battery with the lamp-circuit.

5. In a car-lighting system, the combination with the car and an axle thereof, of a generator driven by said axle, having its armature and field-magnet relatively proportioned and wound to give an armature reaction at normal speed and current sufficient to largely overcome the field, a storage battery connected to said generator-armature, a switch and connections for connecting the field-magnet circuit of said generator to said storage battery, a lighting-circuit and a switch and connections for connecting said storage battery with said lighting-circuit.

6. In a car-lighting system, the combination with the car and an axle thereof, of a generator comprising a sectional spider surrounding and attached to said axle, means for fastening the sections of said spider together, a sectional armature and a sectional commutator carried by and fastened to said sectional spider, and a sectional field-magnet having arms journaled on the said sectional spider.

7. In combination with a car and an axle thereof, said axle having inclined notches, a sectional spider surrounding said axle and having screw-threaded end portions, a series of keys fitting in the notches in the axle and collars having conical bores engaging with said keys and having screw-threaded portions engaging with the screw-threaded portions of the aforesaid spider.

8. In combination with a car and an axle thereof, of a sectional spider surrounding said axle and having two cone portions, split rings having cone portions surrounding and engaging with said cone portions of the spider, said spider and rings having screw-threaded portions engaging with one another to force the cone portions of the split rings against the cone portions of the spider and thus hold the two parts of the spider together, and means for fastening the spider to the axle.

RUFUS N. CHAMBERLAIN.
ALBERT S. HUBBARD.

Witnesses:
ARTHUR P. KNIGHT,
M. V. BIDGOOD.